US011922616B2

(12) United States Patent
Kawamata et al.

(10) Patent No.: US 11,922,616 B2
(45) Date of Patent: Mar. 5, 2024

(54) ALIGNMENT DEVICE

(71) Applicant: OMRON Corporation, Kyoto (JP)

(72) Inventors: Katsuyuki Kawamata, Kyoto (JP); Kensuke Tarumi, Osaka (JP)

(73) Assignee: OMRON CORPORATION, Kyoto (JP)

( * ) Notice: Subject to any disclaimer, the term of this patent is extended or adjusted under 35 U.S.C. 154(b) by 271 days.

(21) Appl. No.: 17/312,724

(22) PCT Filed: Dec. 6, 2019

(86) PCT No.: PCT/JP2019/047835
§ 371 (c)(1),
(2) Date: Jun. 10, 2021

(87) PCT Pub. No.: WO2020/129706
PCT Pub. Date: Jun. 25, 2020

(65) Prior Publication Data
US 2022/0028056 A1   Jan. 27, 2022

(30) Foreign Application Priority Data
Dec. 21, 2018   (JP) .................................. 2018-240270

(51) Int. Cl.
*G06T 7/00*   (2017.01)
*B25J 19/02*   (2006.01)

(52) U.S. Cl.
CPC .......... *G06T 7/0006* (2013.01); *B25J 19/023* (2013.01); *G06T 2207/30164* (2013.01)

(58) Field of Classification Search
CPC ........ G05B 19/402; G05B 2219/42222; G05B 2219/49113; B25J 19/023; B25J 9/023; G06T 7/0006; G06T 2207/30164
See application file for complete search history.

(56) References Cited

U.S. PATENT DOCUMENTS 5,768,759 A   6/1998   Hudson
6,506,614 B1 *   1/2003   Strassmann ........ H05K 13/0413
                                          438/7
(Continued)

FOREIGN PATENT DOCUMENTS

JP   H06300523 A   10/1994
JP   H06314897 A   11/1994
(Continued)

OTHER PUBLICATIONS

EPO Extended European Search Report for corresponding EP Applicaiton No. 19900106.6; dated Jul. 15, 2022.
(Continued)

*Primary Examiner* — Sang H Nguyen
(74) *Attorney, Agent, or Firm* — CANTOR COLBURN LLP (57) ABSTRACT

An alignment device includes a holding device capable of holding the second workpiece, a moving device that moves the holding device toward the first workpiece, a mirror member capable of reflecting the second workpiece, the mirror member being arranged adjacent to the first workpiece, an image sensor arranged to be able to simultaneously and continuously capture the first workpiece and a mirror image of the second workpiece reflected on the mirror member, and a control device that performs feedback control of the moving device based on the calculated position of the second workpiece with respect to the first workpiece based on the first workpiece and the mirror image of the second workpiece, which are captured by the image sensor, to align the second workpiece with the first workpiece.

13 Claims, 6 Drawing Sheets

(56) References Cited

U.S. PATENT DOCUMENTS

| | | | |
|---|---|---|---|
| 2001/0054229 A1* | 12/2001 | Link | ............... H05K 13/0812 29/833 |
| 2001/0055069 A1 | 12/2001 | Hudson | |
| 2002/0030736 A1* | 3/2002 | Hudson | ............ H05K 13/0815 348/86 |
| 2006/0141744 A1* | 6/2006 | Best | ..................... H01L 25/50 257/E21.705 |
| 2007/0037077 A1* | 2/2007 | Best | ................... G03F 9/7003 430/22 |
| 2008/0083114 A1 | 4/2008 | Kim | |
| 2008/0289754 A1* | 11/2008 | Sone | ................... H10K 71/00 156/272.2 |

FOREIGN PATENT DOCUMENTS

| | | |
|---|---|---|
| JP | H07234106 A | 9/1995 |
| JP | 2000068696 A | 3/2000 |
| JP | 2014188617 A | 10/2014 |
| JP | 2018056481 A | 4/2018 |
| WO | 2018043525 A1 | 3/2018 |

OTHER PUBLICATIONS

International Search Report for International Application No. PCT/JP2019/047835; dated Feb. 18, 2020.

PCT Written Opinion of the International Searching Authority for International Application No. PCT/JP2019/047835; dated Feb. 18, 2020.

SIPO First Office Action for corresponding CN Application No. 201980079105.1; dated Dec. 8, 2023; 12 pages.

* cited by examiner

ALIGNMENT DEVICE

CROSS REFERENCE TO RELATED APPLICATIONS

This is the U.S. national stage of application No. PCT/JP2019/047835, filed on Dec. 6, 2019. Priority under 35 U.S.C. § 119(a) and 35 U.S.C. § 365(b) is claimed from Japanese Application No. 2018-240270 filed Dec. 21, 2018, the disclosure of which is also incorporated herein by reference.

TECHNICAL FIELD

The present disclosure relates to an alignment device that aligns a second workpiece with a first workpiece when the second workpiece arranged away from the first workpiece is brought close to the first workpiece.

BACKGROUND ART

Patent Literature 1 discloses a robot control system that performs visual servo based on a captured image in which a reflecting mirror reflecting an object is within an imaging range of an imaging unit and a reference image.

CITATION LIST

Patent Literature

PTL 1 JP 2014-188617 A

SUMMARY OF INVENTION

Technical Problem

The robot control system is configured to be able to image an object from a plurality of directions with one camera and align the object from the plurality of directions by using the reflecting mirror. However, for example, when an object is moved and assembled to a fixed receiving object, it may be difficult to assemble the object to the receiving object unless relative alignment between the object and the receiving object is accurately performed.

An object of the present disclosure is to provide an alignment device capable of more accurately performing relative alignment between a first workpiece and a second workpiece arranged away from the first workpiece.

Solution to Problem

An alignment device of an example of the present disclosure that aligns a second workpiece with a first workpiece arranged on a work surface while bringing the second workpiece, the second work piece being arranged away from the first workpiece in a first direction intersecting the work surface, close to the first workpiece, includes:
- a holding device capable of holding the second workpiece;
- a moving device that moves the holding device toward the first workpiece;
- a mirror member capable of reflecting the second workpiece, the mirror member being arranged adjacent to the first workpiece in a second direction intersecting the first direction;
- an image sensor arranged to be able to simultaneously and continuously capture the first workpiece and a mirror image of the second workpiece reflected on the mirror member when the holding device in a state of holding the second workpiece is moved toward the first workpiece by the moving device; and
- a control device that calculates a position of the second workpiece with respect to the first workpiece based on the first workpiece and the mirror image of the second workpiece, which are captured by the image sensor, and performs feedback control of the moving device based on the calculated position of the second workpiece with respect to the first workpiece to align the second workpiece with the first workpiece.

Advantageous Effects of Invention

According to the alignment device, the relative position of the second workpiece with respect to the first workpiece is calculated based on the image of the first workpiece and the image of the mirror image of the second workpiece, which are captured by the image sensor, and feedback control is performed on the moving device based on the calculated position of the second workpiece to align the second workpiece with the first workpiece. With such a configuration, it is possible to realize the alignment device capable of more accurately performing relative alignment between the first workpiece and the second workpiece arranged away from the first workpiece.

DESCRIPTION OF EMBODIMENTS

Hereinafter, an example of the present disclosure will be described with reference to the accompanying drawings. In the following description, terms indicating specific directions or positions (for example, terms including "up," "down," "right," and "left") are used as necessary, but the use of these terms is to facilitate understanding of the present disclosure with reference to the drawings, and the technical scope of the present disclosure is not limited by the meanings of these terms. Further, the following description is merely exemplary in nature and is not intended to limit the present disclosure, an object for application, or a usage. Furthermore, the drawings are schematic, and ratios of dimensions and the like do not necessarily match actual ones.

Figure 1:
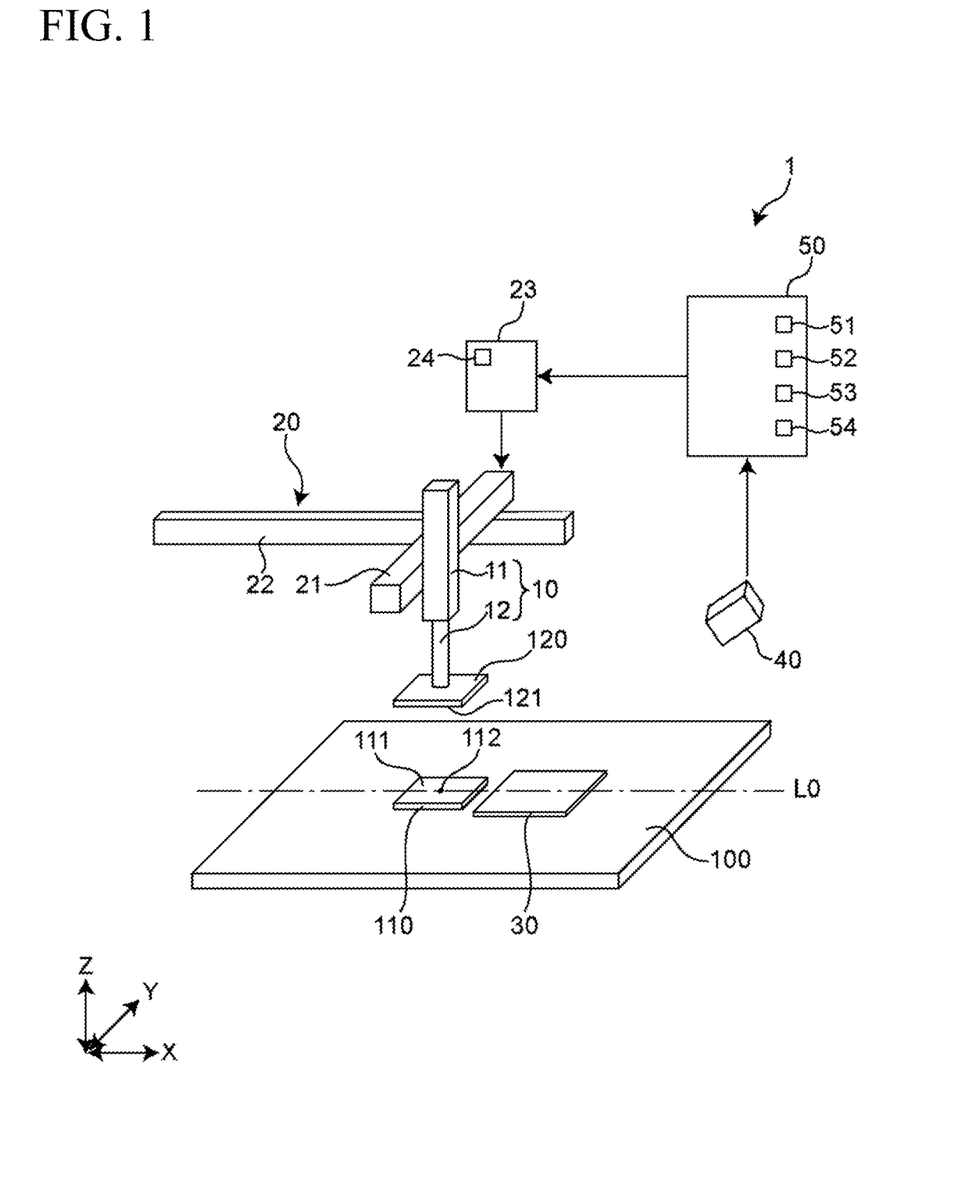
FIG. 1 is a perspective view showing an alignment device according to an embodiment of the present disclosure.

As shown in FIG. 1, an alignment device 1 according to an embodiment of the present disclosure is configured such that a second workpiece 120 arranged away from a first workpiece 110 in a first direction Z intersecting a work surface 100 is allowed to approach and be assembled to the first workpiece 110 arranged on the work surface 100. Specifically, the alignment device 1 includes a holding device 10, a moving device 20 that moves the holding device 10, a mirror member 30 arranged adjacent to the first workpiece 110, an image sensor 40, and a control device 50 that controls the moving device 20.

Figure 2:
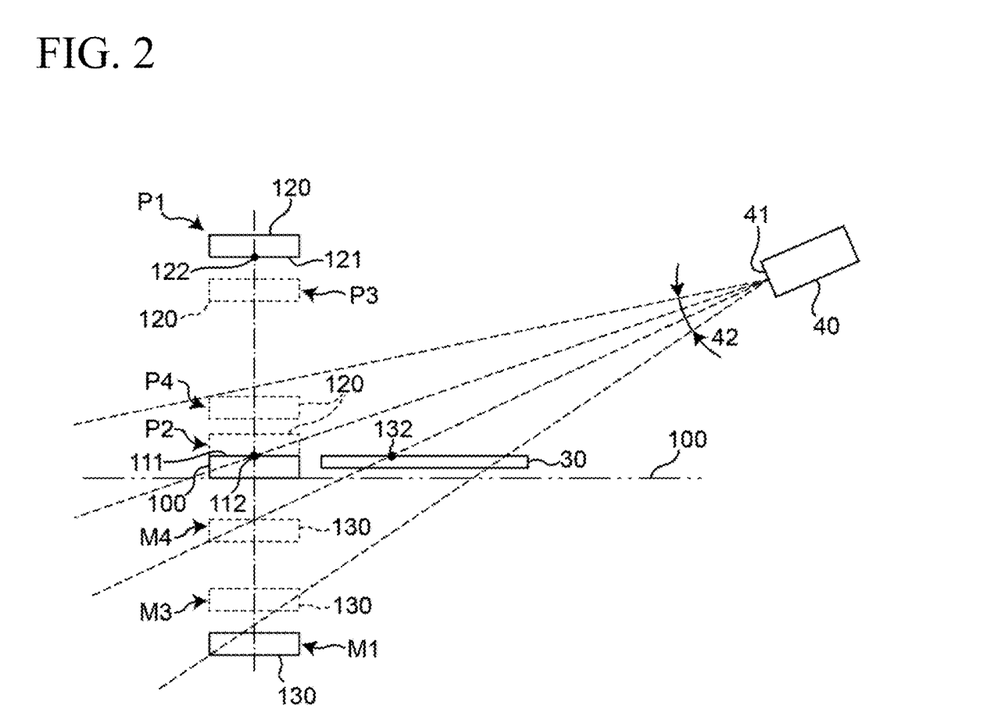
FIG. 2 is a schematic view showing a positional relationship among a first workpiece, a second workpiece, a mirror member, and an image sensor in the alignment device of FIG. 1.

In the present embodiment, as an example, the first workpiece 110 and the second workpiece 120 are configured to be assembled by connecting a connected portion 111 of the first workpiece 110 and a connecting portion 121 of the second workpiece 120 in an aligned state. As shown in FIG. 2, each of the connected portion 111 and the connecting portion 121 includes at least one reference point 112 and 122 that is arranged to face each other and serves as reference for alignment when the second workpiece is assembled to the first workpiece 110 on a plane intersecting the first direction Z (that is, the XY plane).

The holding device 10 is configured to be able to hold the second workpiece 120 in a state where the connecting portion 121 of the second workpiece 120 faces the connected portion 111 of the first workpiece 110. Specifically, the holding device 10 includes a connecting member 11 connected to the moving device 20 in a movable state in the Y direction, and a holding member 12 extending from the connecting member 11 in the first direction Z. The holding member 12 is connected to the connecting member 11 in a state of being movable in the first direction Z and being rotatable about the first direction Z. The holding device 10 may be, for example, an end effector.

The moving device 20 is configured to be able to move the holding device 10 toward the first workpiece 110. Specifically, the moving device 20 includes a connecting member 21 to which the holding device 10 is connected, a rail member 22 that movably supports the connecting member 21 in the X direction, a motor 23 that moves the connecting member 21 of the moving device 20 and the holding member 12 of the holding device 10, and an encoder 24 that detects the rotation of the motor. The encoder 24 is an example of a position detection sensor, and detects the position of the second workpiece 120 in the first direction Z with respect to the first workpiece 110. Information detected by the encoder 24 is output to the control device 50. The moving device 20 may be, for example, a multi-axis robot arm. In this case, the multi-axis robot arm may include the holding device 10. That is, the holding device 10 and the moving device 20 may be configured by a multi-axis robot arm.

In the present embodiment, the moving device 20 is configured to move only the second workpiece 120, but the moving device is not limited thereto. For example, the moving device may be configured to move the first workpiece 110 in the X direction and move the second workpiece 120 in the Y direction.

The mirror member 30 is arranged adjacent to the first workpiece 110 in the second direction X intersecting the first direction Z. The mirror member 30 is configured so that the second workpiece 120 can be reflected thereon when the second workpiece 120 moves from an initial position P1 (shown in FIG. 2) away from the first workpiece 110 to an assembly position P2 (shown in FIG. 2) in contact with the first workpiece 110 in the first direction Z. In the present embodiment, the mirror member 30 is arranged on the same work surface 100 as the first workpiece 110.

The image sensor 40 includes, for example, a COMS area sensor or a CCD area sensor, and has an angle of view 42 radially extending from a center of a detection surface 41 as shown in FIG. 2. The image sensor 40 is arranged so as to be capable of simultaneously capturing the first workpiece 110 and a mirror image 130 of the second workpiece 120 reflected on the mirror member 30 when the holding device 10 holding the second workpiece 120 is moved toward the first workpiece 110 by the moving device 20. In the present embodiment, the image sensor 40 is arranged on a straight line L0 passing through the reference point 112 of the first workpiece 110 and extending in the X direction, and is configured to be able to continuously capture the first workpiece 110 and the mirror image 130 of the second workpiece 120 in the same image.

The position of the image sensor 40 may be detected in advance by a design drawing, measurement in advance, or the like. Alternatively, the position of the image sensor 40 may be detected in advance based on the position of the second workpiece 120 with respect to the first workpiece in the first direction Z and the captured first workpiece 110 and the captured mirror image 130 of the second workpiece 120. In this case, for example, mirror images 130 of the second workpiece 120 at two different positions in the first direction Z are captured in advance. Then, the position of the image sensor 40 is calculated from the position of the second workpiece 120 in the first direction Z with respect to the first workpiece and the position of the second workpiece 120 in the second direction X from the mirror image 130 with respect to the first workpiece 110.

The control device 50 includes a CPU that performs calculation and the like, storage media such as a ROM and a RAM that store programs or data necessary for controlling the moving device 20, and an interface that inputs and outputs signals to and from the outside of the alignment device 1.

The control device 50 calculates the position of the second workpiece 120 with respect to first workpiece 110 based on the first workpiece 110 and the mirror image 130 of the second workpiece 120, which are captured by image sensor 40.

For example, the control device 50 calculates the position of the second workpiece 120 with respect to the first workpiece 110 in the first direction Z based on the information output from the encoder of the moving device 20. Further, the control device 50 calculates positions of the reference point 112 of the first workpiece 110 and a reference point 132 of the mirror image 130 of the second workpiece 120 from the first workpiece 110 and the mirror image 130 of the second workpiece, which are captured by image sensor 40.

The positions of the reference points 112 and 122 of the workpieces 110 and 120 are calculated as follows, for example. That is, the control device 50 detects "feature points" which are outer shapes of the workpieces 110 and 120 of detection marks provided in the workpieces 110 and 120 in advance from the first workpiece 110 and the mirror image 130 of the second workpiece, which are captured by the image sensor 40. Then, the control device 50 calculates the positions of the reference points 112 and 122 of the workpieces 110 and 120 based on the detected "feature points". The reference point 112 of the first workpiece 110 is the reference point 112 of the first workpiece 110 displayed in the image captured by the image sensor 40, and the reference point 132 of the mirror image 130 of the second workpiece 120 is the reference point 122 of the second workpiece 120 reflected on the mirror member 30. The reference point 112 of the first workpiece 110 and the reference point 132 of the mirror image 130 of the second workpiece 120 are calculated as coordinates on the XY plane orthogonal to the first direction Z, for example. The control device 50 performs feedback control of the moving device 20 based on the calculated position of the second workpiece 120 with respect to the first workpiece 110, and aligns the second workpiece 120 with the first workpiece 110.

Figure 4:
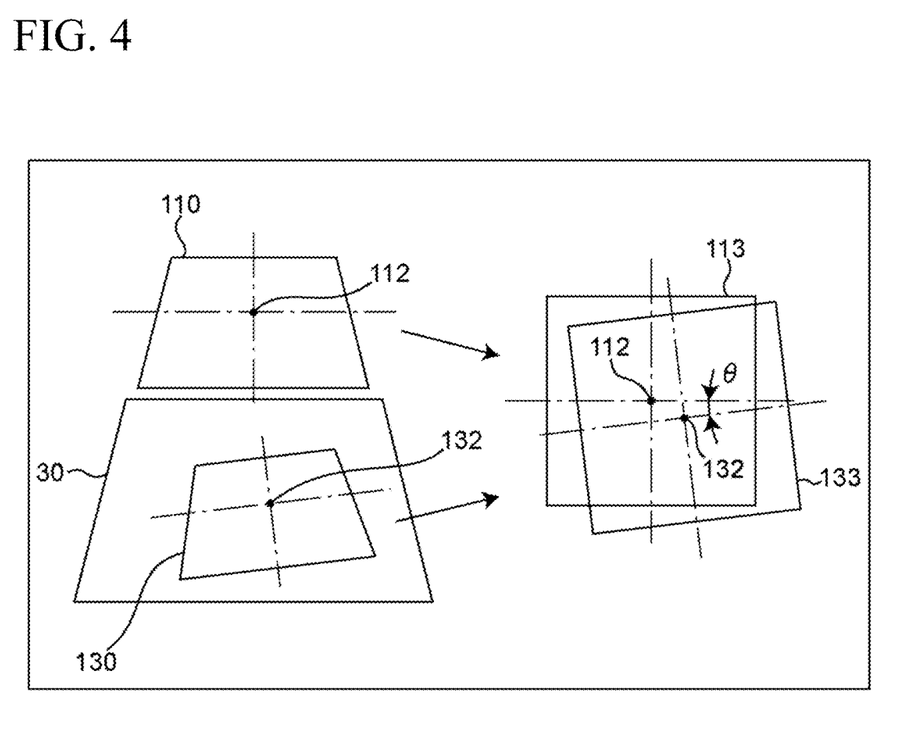
FIG. 4 is a view for explaining calculation of a relative angle of the second workpiece with respect to the first workpiece in the alignment device of FIG. 1.

The control device 50 calculates a relative angle of the second workpiece 120 with respect to the first workpiece 110 from the first workpiece 110 and the mirror image 130 of the second workpiece, which are captured by the image sensor 40. For the relative angle of the second workpiece 120 with respect to the first workpiece 110, for example, as shown in FIG. 4, the first workpiece 110 and the mirror image 130 of the second workpiece 120 are projected on the work surface 100. Then, an angle θ of a projection mapping 133 of the mirror image 130 of the second workpiece 120 projected on the work surface 100 with respect to a projection mapping 113 of the first workpiece 110 projected on the work surface 100 is calculated as the relative angle of the second workpiece 120 with respect to the first workpiece 110.

Specifically, as shown in FIG. 1, the control device 50 includes a position determination unit 51, a movement control unit 52, a correction unit 53, and a calculation determination unit 54.

The position determination unit 51 determines whether or not the second workpiece 120 has reached a predetermined position based on the position of the second workpiece 120 in the first direction Z with respect to the first workpiece 110 detected by the encoder 24 when the second workpiece 120 approaches the first workpiece 110 in the first direction Z from the initial position P1 (shown in FIG. 2). Specifically, the position determination unit 51 determines whether or not the second workpiece 120 has reached a start position P3 (shown in FIG. 2) closer to the first workpiece 110 than the initial position P1. Further, the position determination unit 51 determines whether or not the second workpiece 120 has reached an end position P4 (shown in FIG. 2) closer to the first workpiece 110 than the start position P3.

The start position P3 is, for example, an upper limit position in the first direction Z at which the image sensor 40 can simultaneously image and calculate the reference point 112 of the first workpiece 110 and the reference point 132 of the mirror image 130 of the second workpiece 120 reflected on the mirror member 30. Further, the end position P4 is, for example, a lower limit position in the first direction Z at which the image sensor 40 can simultaneously image and calculate the reference point 112 of the first workpiece 110 and the reference point 132 of the mirror image 130 of the second workpiece 120 reflected on the mirror member 30. Each of the start position P3 and the end position P4 is determined by, for example, performance of an imaging element used in the image sensor 40 or performance of an optical system such as a focal length of a lens and a depth of field.

The movement control unit 52 controls the moving device 20 to move the holding device 10 to bring the reference point 132 of the mirror image 130 of the second workpiece 120 closer to the reference point 112 of the first workpiece 110 while the position determination unit 51 determines that the second workpiece 120 has reached the start position P3 and has not reached the end position P4. The approach path of the reference point 132 to the reference point 112 may be a straight shortest path, or may be a curved or meandering detour path, for example.

As shown in FIG. 4, the correction unit 53 corrects each of the image of the first workpiece 110 and the image of the mirror image 130 of the second workpiece 120, which are captured by the image sensor 40, and converts the corrected images into the projection mappings 113 and 133 projected on the work surface 100. In the present embodiment, the correction unit 53 converts the image of the first workpiece 110 and the image of the mirror image 130 of the second workpiece 120 into the projection mappings 113 and 133 projected on the work surface 100. However, for example, the correction unit 53 may convert the images into projection mappings projected in an optional plane space suitable for alignment of the first workpiece 110 and the second workpiece 120.

The correction unit 53 corrects a size of the image of the mirror image 130 of the second workpiece 120 based on the calculated position of the second workpiece 120 with respect to the first workpiece 110 in the first direction Z.

Figure 3:
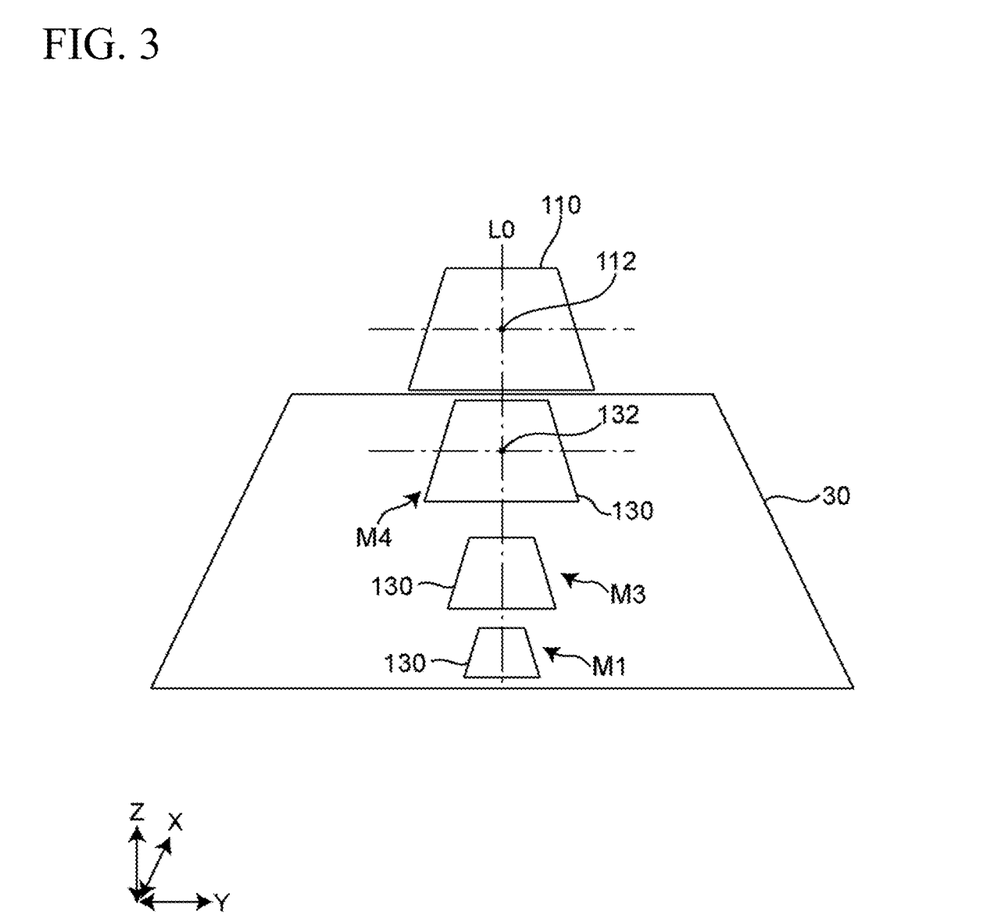
FIG. 3 is a plan view showing a positional relationship between the first workpiece and mirror images of the second workpiece in the alignment device of FIG. 1.

For example, as shown in FIG. 3, when the second workpiece 120 is at the initial position P1, the mirror image 130 of the second workpiece 120 is reflected at a position M1 of the mirror member 30. Further, when the second workpiece 120 is at the start position P3 and the end position P4 between the initial position P1 and the assembly position P2, the mirror image 130 of the second workpiece 120 is reflected at positions M3 and M4 of the mirror member 30, respectively. The image of the mirror image 130 of the second workpiece 120 gradually decreases from the actual size of the second workpiece 120 as being away from the first workpiece 110 in the first direction Z. The correction unit 53 corrects the size of the image of the mirror image 130 of the second workpiece 120 to an actual size of the second workpiece 120 according to the position of the second workpiece 120 in the first direction Z with respect to the first workpiece 110, which is detected by the encoder 24.

By performing these corrections, the calculation accuracy of the position and angle of the reference point 112 of the first workpiece 110 and the position and angle of the reference point 122 of the second workpiece 120 is improved.

The calculation determination unit 54 determines whether or not the position of the second workpiece 120 with respect to the first workpiece 110 can be calculated based on the mirror image 130 of the second workpiece 120 captured by the image sensor 40. Specifically, the calculation determination unit 54 compares an approximation of the shapes of the reference points 112 and 132 or a steepness of the grayscale change of the reference points 112 and 132 between the image of the mirror image 130 of the second workpiece 120 captured in advance and the captured image of the mirror image 130 of the second workpiece 120. Then, as a result of such comparison, the calculation determination unit 54 determines that the position of the second workpiece 120 with respect to the first workpiece 110 can be calculated when the reference point 132 of the mirror image 130 of the second workpiece 120 can be calculated, and determines that the position of the second workpiece 120 with respect to one workpiece 110 cannot be calculated when the reference point 132 of the mirror image 130 of the second workpiece 120 cannot be calculated.

Next, an alignment step of aligning the second workpiece 120 located at the initial position P1 with the first workpiece 110 while moving the second workpiece 120 to the assembly position P2 using the alignment device 1 will be described. These operations described below are performed by the control device 50 executing a predetermined program.

Figure 5:
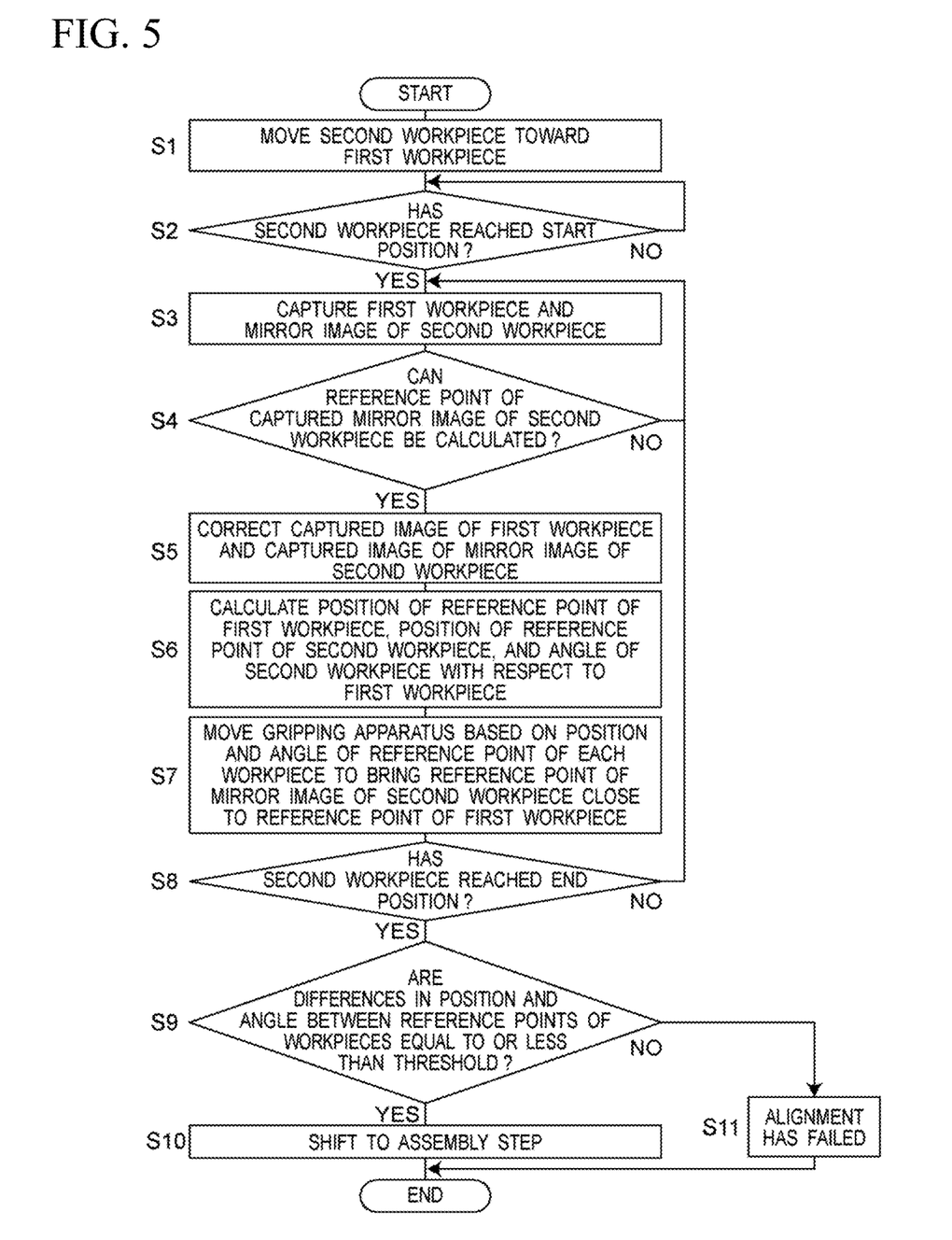
FIG. 5 is a flowchart for explaining an operation of the alignment device of FIG. 1.

As shown in FIG. 5, the control device 50 controls the moving device 20 to move the holding device 10, and starts the movement of the second workpiece 120 located at the initial position P1 toward the first workpiece 110 (step S1).

When the second workpiece 120 starts to move toward the first workpiece 110, the position determination unit 51 determines whether or not the second workpiece 120 has reached the start position P3 based on the position of the second workpiece 120 in the first direction Z with respect to the first workpiece 110, which is detected by the encoder 24 (step S2). When it is determined that the second workpiece 120 has not reached the start position P3, step S2 is repeated until it is determined that the second workpiece 120 has reached the start position P3.

When it is determined that the second workpiece 120 has reached the start position P3, the control device 50 captures the first workpiece 110 and the mirror image 130 of the second workpiece 120 by the image sensor 40 while moving the second workpiece 120 to the first workpiece 110 (step S3).

When the first workpiece 110 and the mirror image 130 of the second workpiece 120 are captured, the calculation determination unit 54 determines whether or not the reference point 132 of the mirror image 130 of the second workpiece 120 can be calculated from the image of the mirror image 130 of the second workpiece 120 captured by the image sensor 40 (step S4). When it is determined that the reference point 132 of the mirror image 130 of the second workpiece 120 cannot be calculated from the image of the mirror image 130 of the second workpiece 120 captured by the image sensor 40, the process returns to step S3, and the next first workpiece 110 and the next mirror image 130 of the second workpiece 120 are captured by the image sensor 40.

When it is determined that the reference point 132 of the mirror image 130 of the second workpiece 120 can be calculated from the image of the mirror image 130 of the second workpiece 120 captured by the image sensor 40, the correction unit 53 corrects each of the captured image of the first workpiece 110 and the captured image of the mirror image 130 of the second workpiece 120 (step S5). Then, based on the corrected image of the first workpiece 110 and the corrected image of the mirror image 130 of the second workpiece 120, the control device 50 calculates the position of the reference point 112 of the first workpiece 110, the position of the reference point 132 of the mirror image 130 of the second workpiece 120, and a relative angle θ of the second workpiece 120 with respect to the first workpiece 110 (step S6).

When the position of the reference point 112 of the first workpiece 110, the position of the reference point 132 of the mirror image 130 of the second workpiece 120, and the relative angle θ of the second workpiece 120 with respect to the first workpiece 110 are calculated, the movement control unit 52 controls the moving device 20 to move the holding device 10 based on the calculated position of the reference point 112 of the first workpiece 110, the calculated position of the reference point 132 of the mirror image 130 of the second workpiece 120, and the calculated relative angle θ of the second workpiece 120 with respect to the first workpiece 110. As a result, the reference point 132 of the mirror image 130 of the second workpiece 120 is brought close to the reference point 112 of the first workpiece 110 (step S7).

After completion of step S7, the position determination unit 51 determines whether or not the second workpiece 120 has reached the end position P4 based on the position of the second workpiece 120 in the first direction Z with respect to the first workpiece 110, which is detected by the encoder 24 (step S8). When it is determined that the second workpiece 120 has not reached the end position P4, the process returns to step S3, and the image sensor 40 captures the next first workpiece 110 and the next mirror image 130 of the second workpiece 120.

When it is determined that the second workpiece 120 has reached the end position P4, the control device 50 determines whether or not a difference between the position of the reference point 112 of the first workpiece 110 and the position of the reference point 132 of the mirror image 130 of the second workpiece 120 and a difference between the angle of the reference point of the first workpiece 110 and the angle of the reference point 132 of the mirror image 130 of the second workpiece 120 are equal to or less than a threshold (step S9). When it is determined that the differences in position and angle between the reference point 112 of the first workpiece 110 and the reference point 132 of the mirror image 130 of the second workpiece 120 are equal to or less than the threshold, the process proceeds to an assembly step of assembling the second workpiece 120 to the first workpiece 110 (step S10), and the alignment step is ended. On the other hand, when it is determined that the differences in position and angle between the reference point 112 of the first workpiece 110 and the reference point 132 of the mirror image 130 of the second workpiece 120 are larger than the threshold, the control device 50 determines that the alignment of the second workpiece 120 with respect to the first workpiece 110 has failed (step S11), and ends the alignment step. The threshold is set according to required alignment accuracy of the first workpiece 110 and the second workpiece 120, or the like.

Figure 6:
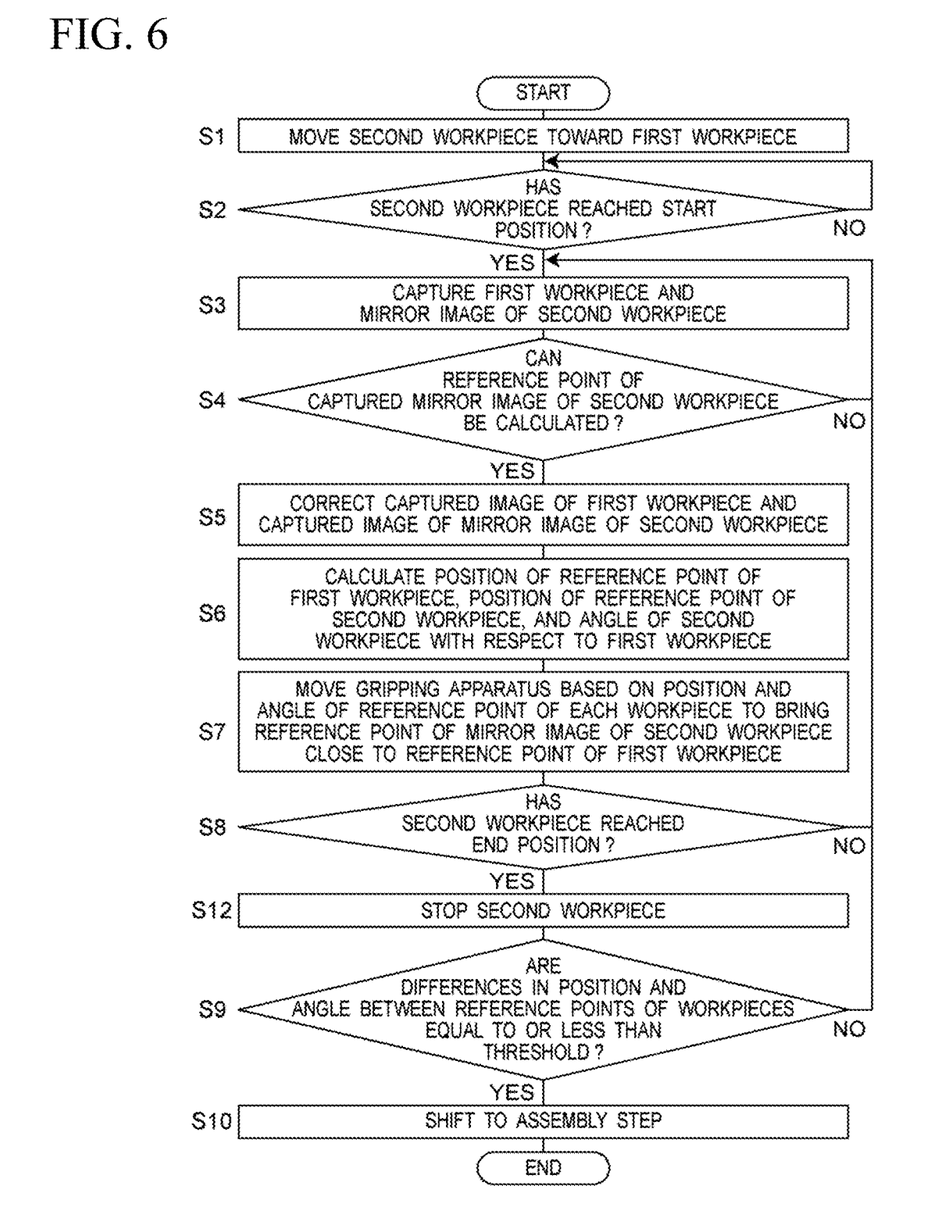
FIG. 6 is a flowchart showing a modification of the alignment device of FIG. 1.

As shown in FIG. 6, after step S8, the second workpiece 120 may be stopped (step S12). In this case, when it is determined in step S9 that the differences in position and angle between the reference point 112 of the first workpiece 110 and the reference point 132 of the mirror image 130 of the second workpiece 120 are larger than the threshold, the process returns to step S3, and steps S3 to S8, step S12, and step S9 are sequentially repeated until it is determined that the differences in position and angle between the reference point 112 of the first workpiece 110 and the reference point 132 of the mirror image 130 of the second workpiece 120 are equal to or less than the threshold.

The control device 50 may be configured to measure the number of times that it is determined in step S12 that the differences in position and angle between the reference point 112 of the first workpiece 110 and the reference point 132 of the mirror image 130 of the second workpiece 120 are larger than the threshold. When the measured number of determinations exceeds a predetermined number, the control device 50 may determine that the alignment of the second workpiece 120 with respect to the first workpiece 110 has failed, and end the alignment step.

As described above, according to the alignment device 1, the position of the second workpiece 120 with respect to the first workpiece 110 is calculated based on the image of the first workpiece 110 and the image of the mirror image 130 of the second workpiece 120, which are captured by the image sensor 40, and feedback control is performed on the moving device 20 based on the calculated position of the second workpiece 120 to align the second workpiece 120 with the first workpiece 110. That is, the control device 50 is configured to perform visual feedback control that repeats feedback control for minimizing a position deviation between the current position and the target position. With such a configuration, it is possible to realize the alignment device 1 capable of more accurately performing relative alignment between the first workpiece 110 and the second workpiece 120 arranged away from the first workpiece 110.

The control device 50 includes the position determination unit 51 that determines whether or not the second workpiece 120 has reached the start position P3 arranged closer to the first workpiece 110 than the initial position P1 at which alignment of the second workpiece 120 with respect to the first workpiece 110 is started, and determines whether or not the second workpiece 120 has reached the end position P4 arranged closer to the first workpiece 110 than the start position P3 at which alignment of the second workpiece 120 with respect to the first workpiece 110 is ended, when the second workpiece 120 approaches the first workpiece 110 in the first direction Z from the initial position P1, based on the position of the second workpiece 120 in the first direction Z with respect to the first workpiece 110, which is detected by the encoder 24, and the movement control unit 52 that controls the moving device 20 to move the holding device 10 while it is determined by the position determination unit 51 that the second workpiece 120 has reached the start position P3 and has not reached the end position P4 to bring the reference point 132 of the mirror image 130 of the second workpiece 120 closer to the reference point 112 of the first workpiece 110. With such a configuration, it is possible to easily realize the alignment device 1 capable of more accurately aligning the second workpiece 120 arranged away from the first workpiece 110 with respect to the first workpiece 110.

When a plurality of reference points 112 and 122 are provided in each of the workpieces 110 and 120, an inclination of the second workpiece 120 with respect to the first workpiece 110 can be calculated from the calculated positions of the plurality of reference points 112 of the first workpiece 110 and the calculated positions of the plurality of reference points 132 of the mirror image 130 of the second workpiece 120.

The control device 50 includes the correction unit 53 that corrects each of the image of the first workpiece 110 and the image of the mirror image 130 of the second workpiece 120, which are captured by the image sensor 40, and converts the images into the projection mappings 113 and 133 onto the work surface 100. The correction unit 53 can enhance the calculation accuracy of the position of the second workpiece 120 with respect to the first workpiece 110 as compared with a case where the captured first workpiece 110 and the captured mirror image 130 of the second workpiece 120 are not corrected.

The correction unit 53 corrects the size of the mirror image 130 of the second workpiece 120 based on the position of the second workpiece 120 in the first direction Z with respect to the first workpiece 110, which is detected by the encoder 24. With such a configuration, the calculation accuracy of the position of the second workpiece 120 with respect to the first workpiece 110 can be enhanced as compared with a case where the captured first workpiece 110 and the captured mirror image 130 of the second workpiece 120 are not corrected.

When the holding device 10 approaches the first workpiece 110 and the image sensor 40 cannot simultaneously capture the reference point 112 of the first workpiece 110 and the reference point 132 of the mirror image 130 of the second workpiece 120, the position determination unit 51 determines that the second workpiece 120 has reached the end position P4. With such a configuration, it is possible to easily realize the alignment device 1 capable of more accurately aligning the second workpiece 120 arranged away from the first workpiece 110 with respect to the first workpiece 110.

In addition, the control device 50 includes the calculation determination unit 54 that determines whether or not the position of the second workpiece 120 with respect to the first workpiece 110 can be calculated based on the mirror image 130 of the second workpiece 120 captured by the image sensor 40. The calculation determination unit 54 can avoid, for example, alignment of the second workpiece 120 with respect to the first workpiece 110 based on an unclear image. As a result, the second workpiece 120 can be accurately and efficiently aligned with the first workpiece 110.

The alignment device 1 is not limited to the above embodiment as long as the alignment device 1 is configured to calculate the position of the second workpiece 120 with respect to the first workpiece 110 based on the image of the first workpiece 110 and the mirror image 130 of the second workpiece 120, which are captured by the image sensor 40, and perform feedback control of the moving device 20 based on the calculated position of the second workpiece 120 to align the second workpiece 120 with the first workpiece 110. For example, the correction unit 53 and the calculation determination unit 54 may be omitted.

The mirror member 30 is not limited to be arranged on the work surface 100, and may be arranged, for example, at a position farther from the second workpiece 120 than the work surface 100 in the first direction Z. The mirror member 30 may be configured to be movable in the first direction Z when the second workpiece 120 is moved toward the first workpiece 110. With this configuration, it is possible to expand a range in which the reference point 112 of the first workpiece 110 and the reference point 142 of the mirror image 140 of the second workpiece 120 can be simultaneously imaged.

Various embodiments of the present disclosure have been described above in detail with reference to the drawings. Finally, various aspects of the present disclosure will be described. In the following description, as an example, reference numerals are also added.

An alignment device 1 of a first aspect of the present disclosure that aligns a second workpiece 120 with a first workpiece 110 arranged on a work surface 100 while bringing the second workpiece 120 close to the first workpiece 110, the second work piece 120 being arranged away from the first workpiece 110 in a first direction Z intersecting the work surface 100, includes:

a holding device 10 capable of holding the second workpiece 120;

a moving device 20 that moves the holding device 10 toward the first workpiece 110;

a mirror member 30 that is arranged adjacent to the first workpiece 110 in second directions X and Y intersecting the first direction Z, on which the second workpiece 120 can be reflected;

an image sensor 40 arranged to be able to simultaneously and continuously capture the first workpiece 110 and a mirror image 130 of the second workpiece 120 reflected on the mirror member 30 when the holding device 10 in a state of holding the second workpiece 120 is moved toward the first workpiece 110 by the moving device 20; and a control device 50 that calculates a position of the second workpiece 120 with respect to the first workpiece 110 based on the first workpiece 110 and the mirror image 130 of the second workpiece 120, which are captured by the image sensor 40, and performs feedback control of the moving device 20 based on the calculated position of the second workpiece 120 to align the second workpiece 120 with the first workpiece 110.

According to the alignment device 1 of the first aspect, the relative position of the second workpiece 120 with respect to the first workpiece 110 is calculated based on the image of the first workpiece 110 and the image of the mirror image 130 of the second workpiece 120, which are captured by the image sensor 40, and feedback control is performed on the moving device 20 based on the calculated position of the second workpiece 120 to align the second workpiece 120 with the first workpiece 110. With such a configuration, it is possible to realize the alignment device 1 capable of more accurately performing relative alignment between the first workpiece 110 and the second workpiece 120 arranged away from the first workpiece 110.

In the alignment device 1 of a second aspect of the present disclosure, each of the first workpiece 110 and the second workpiece 120 includes at least one reference point 112 and 122 that is arranged to face each other and serves as references for alignment when the second workpiece 120 is aligned with the first workpiece 110 on a plane intersecting the first direction Z, the position of the second workpiece 120 with respect to the first workpiece 110 calculated by the control device 50 is a position of the reference point 132 of the mirror image 130 of the second workpiece 120 with respect to the reference point 112 of the first workpiece 110, the alignment device 1 further includes a position detection sensor 24 that detects the position of the second workpiece 120 in the first direction Z with respect to the first workpiece 110, and the control device includes:

a position determination unit 51 that based on the position of the second workpiece 120 in the first direction Z with respect to the first workpiece 110, which is detected by the position detection sensor 24, determines whether or not the second workpiece 120 has reached a start position P3 arranged closer to the first workpiece 110 than an initial position P1 at which alignment of the second workpiece 120 with respect to the first workpiece 110 is started, and that determines whether or not the second workpiece 120 has reached an end position P4 arranged closer to the first workpiece 110 than the start position P3 at which alignment of the second workpiece 120 with respect to the first workpiece 110 is ended, when the second workpiece 120 approaches the first workpiece 110 in the first direction Z from the initial position P1; and a movement control unit 52 that controls the moving device 20 to move the holding device 10 so that the reference point 132 of the mirror image 130 of the second workpiece 120 is brought closer to the reference point 112 of the first workpiece 110 while it is determined by the position determination unit 51 that the second workpiece 120 has reached the start position P3 and has not reached the end position P4.

According to the alignment device 1 of the second aspect, it is possible to easily realize the alignment device 1 capable of more accurately aligning the second workpiece 120 arranged away from the first workpiece 110 with respect to the first workpiece 110.

In the alignment device 1 of a third aspect of the present disclosure, the control device 50 includes a correction unit 53 that corrects each of an image of the first workpiece 110 and an image of the mirror image 130 of the second workpiece 120, which are captured by the image sensor 40, and converts the images into projection mappings 113 and 133 onto an optional plane 100.

According to the alignment device 1 of the third aspect, the calculation accuracy of the position of the second workpiece 120 with respect to the first workpiece 110 can be enhanced as compared with a case where the captured image of the first workpiece 110 and the captured image of the mirror image 130 of the second workpiece 120 are not corrected.

In the alignment device 1 of a fourth aspect of the present disclosure, the correction unit 53 corrects a size of the image of the mirror image 130 of the second workpiece 120 based on the position of the second workpiece 120 in the first direction Z with respect to the first workpiece 110, which is detected by the position detection sensor 24.

According to the alignment device of the fourth aspect, the calculation accuracy of the position of the second workpiece 120 with respect to the first workpiece 110 can be enhanced as compared with a case where the captured image of the mirror image 130 of the second workpiece 120 is not corrected.

In the alignment device 1 of a fifth aspect of the present disclosure, the position determination unit 51 determines that the second workpiece 120 has reached the end position P4 when the holding device 10 approaches the first workpiece 110 and the image sensor 40 cannot simultaneously capture the reference point 112 of the first workpiece 110 and the reference point 132 of the mirror image 130 of the second workpiece 120.

According to the alignment device 1 of the fifth aspect, it is possible to easily realize the alignment device 1 capable of more accurately aligning the second workpiece 120 arranged away from the first workpiece 110 with respect to the first workpiece 110.

In the alignment device 1 of a sixth aspect of the present disclosure, the control device 50 includes a calculation determination unit 54 that determines whether or not the position of the second workpiece 120 with respect to the first workpiece 110 can be calculated based on the mirror image 130 of the second workpiece 120 captured by the image sensor 40.

According to the alignment device of the sixth aspect, for example, alignment of the second workpiece 120 with respect to the first workpiece 110 based on an unclear image can be avoided. As a result, the second workpiece 120 can be accurately and efficiently aligned with the first workpiece 110.

By appropriately combining any embodiments or modifications among the various embodiments or modifications, the effects of the respective embodiments or modifications can be achieved. In addition, combinations of embodiments, combinations of examples, or combinations of embodiments and examples are possible, and combinations of features in different embodiments or examples are also possible.

Although the present disclosure has been fully described in connection with preferred embodiments with reference to the accompanying drawings, various modifications and corrections will be apparent to those skilled in the art. Such modifications and corrections are to be understood as being included within the scope of the present disclosure as set forth in the appended claims.

INDUSTRIAL APPLICABILITY

The alignment device of the present disclosure can be applied to, for example, an automatic assembling device.

REFERENCE SIGNS LIST 1. alignment device
10. holding device
11. connecting member
12. holding member
20. moving device
21. connecting member
22. rail member
30. mirror member
40. image sensor
41. detection surface
42. angle of view
50. control device
51. position determination unit
52. movement control unit
53. correction unit
54. calculation determination unit
100. work surface
110. first workpiece
111. connected portion
112. reference point
113. projection mapping
120. second workpiece
121. connecting portion
122. reference point
130. mirror image
132. reference point
133. projection mapping

The invention claimed is:

1. An alignment device that aligns a second workpiece with a first workpiece arranged on a work surface while bringing the second workpiece close to the first workpiece, the second work piece being arranged away from the first workpiece in a first direction intersecting the work surface, the alignment device comprising:
a holding device capable of holding the second workpiece;
a moving device that moves the holding device toward the first workpiece;
a mirror member capable of reflecting the second workpiece, the mirror member being arranged adjacent to the first workpiece in a second direction intersecting the first direction;
an image sensor arranged to be able to simultaneously and continuously capture the first workpiece and a mirror image of the second workpiece reflected on the mirror member when the holding device in a state of holding the second workpiece is moved toward the first workpiece by the moving device; and
a control device that calculates a position of the second workpiece with respect to the first workpiece based on the first workpiece and the mirror image of the second workpiece, which are captured by the image sensor, and performs feedback control of the moving device based on the calculated position of the second workpiece to align the second workpiece with the first workpiece.

2. The alignment device according to claim 1, wherein each of the first workpiece and the second workpiece includes at least one reference point that is arranged to face each other and serves as reference for alignment when the second workpiece is aligned with the first workpiece on a plane intersecting the first direction,
the position of the second workpiece with respect to the first workpiece calculated by the control device is a position of the reference point of the mirror image of the second workpiece with respect to the reference point of the first workpiece,
the alignment device further comprise a position detection sensor that detects the position of the second workpiece in the first direction with respect to the first workpiece, and
the control device includes:
a position determination unit that based on the position of the second workpiece in the first direction with respect to the first workpiece, which is detected by the position detection sensor, determines whether the second workpiece has reached a start position arranged closer to the first workpiece than an initial position at which alignment of the second workpiece with respect to the first workpiece is started, and that determines whether the second workpiece has reached an end position arranged closer to the first workpiece than the start position at which alignment of the second workpiece with respect to the first workpiece is ended, when the second workpiece approaches the first workpiece in the first direction from the initial position; and
a movement control unit that controls the moving device to move the holding device so that the reference point of the mirror image of the second workpiece is brought closer to the reference point of the first workpiece while it is determined by the position determination unit that the second workpiece has reached the start position and has not reached the end position.

3. The alignment device according to claim 2, wherein the control device includes a correction unit that corrects each of an image of the first workpiece and an image of the mirror image of the second workpiece, which are captured by the image sensor, and converts the images into projection mappings onto an optional plane.

4. The alignment device according to claim 3, wherein the correction unit corrects a size of the image of the mirror image of the second workpiece based on the position of the second workpiece in the first direction with respect to the first workpiece, which is detected by the position detection sensor.

5. The alignment device according to claim 4, wherein the position determination unit determines that the second workpiece has reached the end position when the holding device approaches the first workpiece and the image sensor cannot simultaneously capture the reference point of the first workpiece and the reference point of the mirror image of the second workpiece.

6. The alignment device according to claim 4, wherein the control device includes a calculation determination unit that determines whether the position of the second workpiece with respect to the first workpiece can be calculated based on the mirror image of the second workpiece captured by the image sensor.

7. The alignment device according to claim 3, wherein the position determination unit determines that the second workpiece has reached the end position when the holding device approaches the first workpiece and the image sensor cannot simultaneously capture the reference point of the first workpiece and the reference point of the mirror image of the second workpiece.

8. The alignment device according to claim 7, wherein the control device includes a calculation determination unit that determines whether the position of the second workpiece with respect to the first workpiece can be calculated based on the mirror image of the second workpiece captured by the image sensor.

9. The alignment device according to claim 3, wherein the control device includes a calculation determination unit that determines whether the position of the second workpiece with respect to the first workpiece can be calculated based on the mirror image of the second workpiece captured by the image sensor.

10. The alignment device according to claim 2, wherein the position determination unit determines that the second workpiece has reached the end position when the holding device approaches the first workpiece and the image sensor cannot simultaneously capture the reference point of the first workpiece and the reference point of the mirror image of the second workpiece.

11. The alignment device according to claim 10, wherein the control device includes a calculation determination unit that determines whether the position of the second workpiece with respect to the first workpiece can be calculated based on the mirror image of the second workpiece captured by the image sensor.

12. The alignment device according to claim 2, wherein the control device includes a calculation determination unit that determines whether the position of the second workpiece with respect to the first workpiece can be calculated based on the mirror image of the second workpiece captured by the image sensor.

13. The alignment device according to claim 1, wherein the control device includes a calculation determination unit that determines whether the position of the second workpiece with respect to the first workpiece can be calculated based on the mirror image of the second workpiece captured by the image sensor.

* * * * *